US008595525B2

(12) United States Patent
Anderson et al.

(10) Patent No.: US 8,595,525 B2
(45) Date of Patent: Nov. 26, 2013

(54) ON-CHIP THERMAL MANAGEMENT TECHNIQUES USING INTER-PROCESSOR TIME DEPENDENT POWER DENSITY DATA FOR INDENTIFICATION OF THERMAL AGGRESSORS

(75) Inventors: Jon J. Anderson, Boulder, CO (US); Victor A. Chiriac, San Diego, CA (US); Sorin A. Dobre, San Diego, CA (US); Maria G. Lupetini, San Diego, CA (US); Joseph V. Zanotelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/290,456

(22) Filed: Nov. 7, 2011

(65) Prior Publication Data

US 2013/0079946 A1  Mar. 28, 2013

Related U.S. Application Data

(60) Provisional application No. 61/537,819, filed on Sep. 22, 2011.

(51) Int. Cl.
  *G06F 1/32* (2006.01)
(52) U.S. Cl.
  CPC ............ *G06F 1/3228* (2013.01); *G06F 1/3287* (2013.01); *G06F 1/329* (2013.01); *Y02B 60/1207* (2013.01); *Y02B 60/148* (2013.01)
  USPC ............ 713/320; 713/323; 713/324; 713/330
(58) Field of Classification Search
  USPC ....................................................... 713/300
  See application file for complete search history.

(56) References Cited

U.S. PATENT DOCUMENTS

| | | | | |
|---|---|---|---|---|
| 6,289,439 B1 * | 9/2001 | Munson et al. | ............... | 712/226 |
| 6,848,054 B1 * | 1/2005 | Watts, Jr. | ...................... | 713/300 |
| 6,996,728 B2 * | 2/2006 | Singh | ............................. | 713/300 |
| 7,051,221 B2 * | 5/2006 | Clabes et al. | ................. | 713/320 |
| 7,111,177 B1 * | 9/2006 | Chauvel et al. | ............... | 713/300 |

(Continued)

FOREIGN PATENT DOCUMENTS

| | | |
|---|---|---|
| EP | 1096360 A1 | 5/2001 |
| EP | 1734446 A1 | 12/2006 |

OTHER PUBLICATIONS

International Search Report and Written Opinion—PCT/US2012/053333—ISA/EPO—Nov. 23, 2012.

*Primary Examiner* — Ryan Stiglic
(74) *Attorney, Agent, or Firm* — Nicholas A. Cole

(57) ABSTRACT

Various embodiments of methods and systems for controlling and/or managing thermal energy generation on a portable computing device are disclosed. Data discarded from one or more processing core registers may be monitored and analyzed to deduce individual workloads that have been processed by each of the cores over a unit of time. From the deduced workloads, the power consumed by each of the cores over the unit of time in order to process the workload can be calculated. Subsequently, a time dependent power density map can be created which reflects a historical and near real time power consumption for each core. Advantageously, because power consumption can be correlated to thermal energy generation, the TDPD map can be leveraged to identify thermal aggressors for targeted, fine grained application of thermal mitigation techniques. In some embodiments, workloads may be reallocated from the identified thermal aggressors to the identified underutilized processing components.

40 Claims, 8 Drawing Sheets

(56) References Cited

U.S. PATENT DOCUMENTS

| | | | |
|---|---|---|---|
| 7,451,332 B2* | 11/2008 | Culbert et al. | 713/320 |
| 7,512,530 B2* | 3/2009 | Aguilar et al. | 703/13 |
| 7,552,346 B2* | 6/2009 | Aguilar et al. | 713/300 |
| 7,698,583 B2* | 4/2010 | Gaskins et al. | 713/300 |
| 7,788,670 B2* | 8/2010 | Bodas et al. | 718/105 |
| 7,809,869 B2* | 10/2010 | Atherton et al. | 710/104 |
| 7,822,996 B2* | 10/2010 | Watts, Jr. | 713/300 |
| 7,949,888 B2* | 5/2011 | Cox et al. | 713/323 |
| 7,975,156 B2* | 7/2011 | Artman et al. | 713/323 |
| 8,015,423 B1* | 9/2011 | Satterfield et al. | 713/322 |
| 8,166,319 B2* | 4/2012 | Svensson et al. | 713/320 |
| 8,166,328 B2* | 4/2012 | Yang et al. | 713/324 |
| 8,190,939 B2* | 5/2012 | Fields, Jr. et al. | 713/324 |
| 8,195,970 B2* | 6/2012 | Artman et al. | 713/323 |
| 8,214,682 B2* | 7/2012 | Vaidyanathan et al. | 713/400 |
| 8,225,119 B2* | 7/2012 | Jain et al. | 713/320 |
| 8,364,999 B1* | 1/2013 | Adessa | 713/323 |
| 8,464,086 B2* | 6/2013 | Cepulis | 713/323 |
| 2003/0115495 A1* | 6/2003 | Rawson, III | 713/324 |
| 2003/0217297 A1 | 11/2003 | Gschwind et al. | |
| 2004/0148528 A1* | 7/2004 | Silvester | 713/300 |
| 2005/0107997 A1* | 5/2005 | Watts et al. | 703/21 |
| 2006/0179136 A1* | 8/2006 | Loboz et al. | 709/224 |
| 2006/0236135 A1* | 10/2006 | Jones | 713/300 |
| 2007/0016815 A1* | 1/2007 | Cooper et al. | 713/322 |
| 2007/0061021 A1 | 3/2007 | Cohen et al. | |
| 2009/0177422 A1* | 7/2009 | Cox et al. | 702/64 |
| 2009/0177907 A1* | 7/2009 | Sotomayor et al. | 713/340 |
| 2009/0259871 A1* | 10/2009 | Vaidyanathan et al. | 713/400 |
| 2009/0271141 A1 | 10/2009 | Coskun et al. | |
| 2010/0191993 A1* | 7/2010 | Chaudhry et al. | 713/322 |
| 2011/0022871 A1 | 1/2011 | Bouvier et al. | |
| 2011/0145605 A1* | 6/2011 | Sur et al. | 713/300 |
| 2012/0023345 A1* | 1/2012 | Naffziger et al. | 713/320 |

* cited by examiner

ON-CHIP THERMAL MANAGEMENT TECHNIQUES USING INTER-PROCESSOR TIME DEPENDENT POWER DENSITY DATA FOR INDENTIFICATION OF THERMAL AGGRESSORS

CROSS-REFERENCE TO RELATED APPLICATIONS

Priority under 35 U.S.C. §119(e) is claimed to the U.S. provisional application entitled "ON-CHIP THERMAL MANAGEMENT TECHNIQUES USING INTER-PROCESSOR TIME DEPENDENT POWER DENSITY DATA FOR IDENTIFICATION OF THERMAL AGGRESSORS," filed on Sep. 22, 2011 and assigned application Ser. No. 61/537,819, the entire contents of which are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. When two or more heat producing components are suitably spaced from one another within a PCD, heat generated from the operation of each component may not negatively impact the operation of the other. Moreover, when a heat producing component within a PCD is physically isolated from other components within the device, the heat generated from the operation of the heat producing component may not negatively impact other surrounding electronics. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there just typically isn't enough space within a PCD for engineers and designers to mitigate thermal degradation or failure through the leveraging of spatial arrangements or placement of passive cooling components.

Currently, when a PCD approaches a critical temperature, the operating system is designed to cool the PCD by either "wilting" or simply shutting down most of the electronic components within the PCD which are generating, or are suspected of generating, the excessive thermal energy. While wilting or shutting down electronics may be an effective measure for avoiding the generation of excessive thermal energy within a PCD, such drastic measures inevitably impact performance of a PCD and, in some cases, may even render a PCD functionally inoperable for a period time.

Accordingly, what is needed in the art is a method and system for identifying specific components within a PCD that are thermal aggressors so that fine grained thermal mitigation techniques may be applied to promote cooling of components within the PCD without over-impacting its performance and functionality.

SUMMARY OF THE DISCLOSURE

Various embodiments of methods and systems for controlling and/or managing thermal energy generation on a portable computing device are disclosed. Because temperature readings near a particular processing core may be attributable to thermal energy emanating from a proximate thermal aggressor, one such method involves monitoring data discarded from one or more processing core registers. Registers are uniquely associated with each processing core of a CPU and the discarded data can be analyzed to deduce individual workloads that have been processed by each of the cores over a unit of time. From the deduced workloads, the power consumed by each of the cores over the unit of time in order to process the workload can be calculated. Notably, it is an advantage of embodiments that the power consumption may be deduced without need to leverage on-chip power sensors such as current sensors and/or voltage sensors.

Once the power consumption for each core has been calculated based on the monitored data discarded from the registers, a time dependent power density map can be created which reflects a historical and near real time power consumption for each core. Advantageously, because power consumption can be correlated to thermal energy generation, the TDPD map can be parsed or referenced to identify which cores are "thermal aggressors," i.e. producing higher amounts of thermal energy relative to other cores. Similarly, the TDPD map may also be leveraged to identify which cores are underutilized and, thus, may be good candidates for future workload allocation.

Temperature sensors proximate to each core may be monitored to detect that a temperature threshold has been exceeded. Notably, however, cores other than the core primarily associated with the given sensor may be thermal aggressors that are contributing to the detected rise in temperature. In such a case, application of thermal mitigation techniques to the core primarily associated with the given sensor may yield minimal benefits. Further, a blanket application of thermal mitigation techniques across all cores will cause user experience to suffer unnecessarily. Therefore, embodiments may leverage the TDPD map to identify the thermal aggressors for targeted, fine grained application of thermal mitigation techniques. In some embodiments, workloads may be reallocated from the identified thermal aggressors to the identified underutilized processing components.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
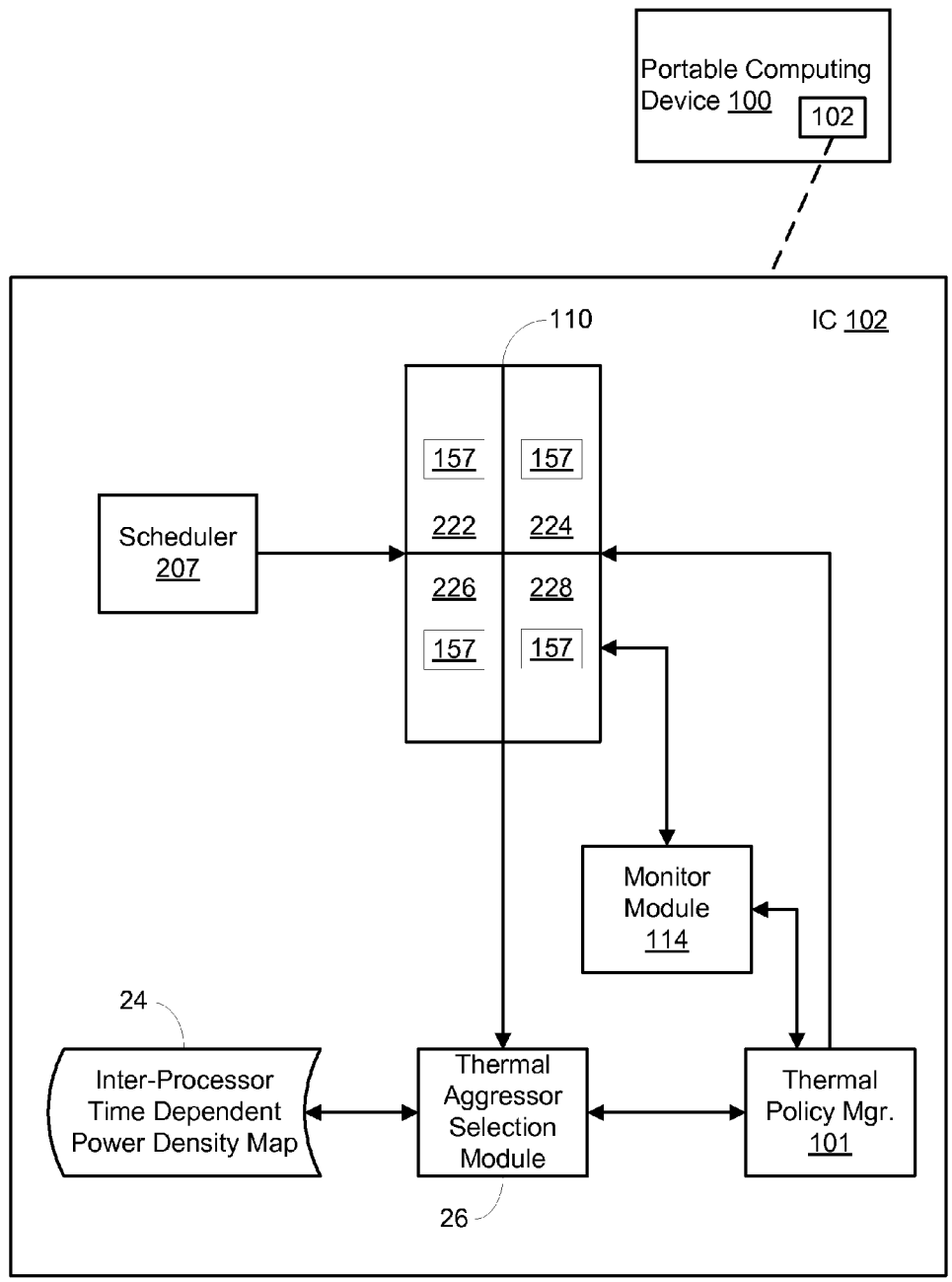
FIG. 1 is a functional block diagram illustrating an embodiment of an on-chip system for generating an inter-processor time dependent power density ("TDPD") map in a portable computing device ("PCD") and leveraging the TDPD map to identify and select thermal aggressors for targeted application of fine grained thermal mitigation measures.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, it will be understood that the terms "thermal" and "thermal energy" may be used in association with a device or component capable of generating or dissipating energy that can be measured in units of "temperature." Consequently, it will be further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a thermal aggressor, one of ordinary skill in the art will acknowledge that use of these "thermal" terms in the present disclosure may be related to process load distributions, workload burdens and power consumption.

In this description, the terms "thermal mitigation technique(s)," "thermal policies" and "thermal mitigation measure(s) are used interchangeably.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

FIG. 1 is a functional block diagram illustrating an exemplary embodiment of an on-chip system 102 for generating an inter-processor time dependent power density ("TDPD") map 24 in a portable computing device ("PCD") 100. The on-chip system may subsequently leverage the TDPD map 24 to identify and select thermal aggressors in the PCD for targeted application of fine grained thermal mitigation measures. Advantageously, by targeting the application of thermal mitigation measures using a fine grained approach, the quality of service ("QoS") experienced by the user of a PCD may be maximized as only the components identified as thermal aggressors are subject to mitigation measures that can affect performance. In general, the system employs two main phases: (1) a mapping phase performed by the thermal aggressor selection ("TAS") module 26; and (2) a thermal mitigation phase performed by the thermal policy manager ("TPM") 101.

The mapping phase involves monitoring data discarded or "dumped" from the various register memories known in the art to be uniquely associated with individual processing cores such as exemplary cores 222, 224, 226, 228 of a CPU 110. As is understood in the art, the registers for a given core within a CPU are dedicated memory devices used by a core for active processing of workload tasks. As the various computational tasks within an assigned workload are performed by a given core, the data that is temporarily stored on the registers while the core completes a workload task is discarded in anticipation of the next task to be completed. Consequently, by monitoring the register dumps of each core, the TAS module 26 may deduce the real time and historical workload processed by the individual cores. Notably, because the workload deduced to have been processed by a given core over a unit of time may be correlated with power consumed by the core over such unit of time, the TAS module 26 may generate and continually update a time dependent power density ("TDPD") map 24 that reflects the workload for each core.

The data stored in the TDPD map 24 may be generated in various embodiments through statistical analysis of the register dump outputs. For instance, in some embodiments, the TAS module 26 may compare the register dump outputs to predefined benchmarks, test case results and/or use scenarios. In this way, if the monitored register dump outputs are determined to mirror output patterns associated with known use scenarios, for example, the TAS module 26 may deduce that the present state of thermal generation for the given core is consistent with that of the particular use scenario. Similarly, in some embodiments, the data gathered from monitoring the register dumps may be mined for data reflecting specific metrics or profiles and then analyzed statistically to generate a model of power consumption over a period of time. Some embodiments may monitor the number of millions of instructions per second ("MIPS") that are processed by a core and then correlate that workload to an estimated power consumption based on the performance specs of the core. Similarly, other embodiments may monitor cache hits and misses in an effort to determine power consumption as it may correlate with the complexity of computations being performed by a given core. Essentially, through application of statistical analysis to data monitored from register dump outputs, one of ordinary skill in the art will recognize that a CPU's power consumption over a certain period of time can be deduced.

Advantageously, from the TDPD map 24, the TAS module 26 may track the power consumption levels of the particular core or cores 222, 224, 226, 228 without having to rely on direct power monitoring devices such as, but not limited to, current sensors, voltage sensors and the like. Subsequently, the TDPD map 24 may be leveraged by the TAS module 26 to compare deduced power consumption of the individual cores and identify those that are "thermal aggressors," i.e. those components that are dissipating excessive amounts of thermal energy relative to other components.

Cores 222, 224, 226, 228 within CPU 110 that are identified by TAS module 26 to be a thermal aggressor may compromise user experience of PCD 100 or become otherwise detrimental to the functionality of PCD 100. Notably, as thermal energy dissipation may be increased when processing loads are concentrated in a given component, thereby potentially impacting PCD 100 performance and/or user experience, thermal energy generation can be mitigated with minimal impact on QoS by reallocation of processing load across complimentary components. As such, the TAS module 26 may further leverage the TDPD map 24 to not only identify thermal aggressors, but also identify underutilized processing resources that are candidates for receipt of workloads that may be reallocated from selected thermal aggressors.

In some embodiments, temperature sensors 157 may be placed proximally to the various cores 222, 224, 226, 228 and monitored by a monitoring module 114. Simultaneously, the TAS module 26 may continue to monitor the register dump outputs of the various cores 222, 224, 226, 228 and update the TDPD map 24 accordingly. When a temperature threshold is sensed by a sensor, such as sensor 157A1 for example, and recognized by monitoring module 114, TPM module 101 may be triggered to apply one or more thermal mitigation measures in an attempt to reduce thermal energy generation within CPU 110. To reduce the thermal energy sensed by the exemplary sensor 157A1, the TPM module 101 may apply thermal mitigation measures directly to the core 222 locally associated with sensor 157A1 and/or may apply thermal mitigation measures to identified thermal aggressors near core 222.

For instance, even though sensor 157A1 may be associated with core 222, the temperature sensed by sensor 157A1 may not be uniquely attributable to a workload processed by core 222. As an example, thermal energy sources not actually on the chip 102 and/or other processing components near core 222 (i.e., thermal aggressors) may be contributing to the thermal energy rise detected by sensor 157A1. As a result, significant reduction in the thermal energy sensed by sensor 157A1 may not be realized through application of thermal mitigation techniques to core 222. Advantageously, because thermal aggressors near core 222 may be readily identified within TDPD map 24, the TPM 101 may be directed by TAS module 26 to target thermal aggressors near core 222 in an effort to reduce the temperature sensed by sensor 157A1. Moreover, because underutilized processing components, in addition to thermal aggressors, may also be readily identified by reference to TDPD map 24, TAS module 26 may provide TPM 101 with processing components that are candidates for receipt of workloads that TPM 101 may reallocate as part of a fine grained thermal mitigation technique.

The reallocation of workload from a thermal aggressor to a relatively underutilized processing component may be an aspect of a thermal mitigation technique implemented by TPM 101. As explained above, the identification of thermal aggressors and underutilized processing components on CPU 110 is the primary function of the mapping phase performed by TAS module 26. Because the actual thermal aggressors and underutilized processing components on chip 102 are readily identifiable via the TDPD map 24, when a threshold temperature is sensed by a temperature sensor 157 the TPM 101 may be directed to apply a fine grained thermal mitigation measure targeted at specific thermal aggressors that may or may not be intuitively associated with the specific sensor 157. The targeted application of the fine grained thermal mitigation techniques is the primary function of the second phase.

For example, when a threshold temperature is detected by a sensor 157, the TPM 101 may improve the PCD 100 performance and user experience by "steering" or reallocating all or a portion of the processing load from a thermal aggressor identified by TAS module 26 to an alternative, underutilized processing component that is available for processing. In some embodiments, the TPM 101 may simply "clock" the processing speed of the thermal aggressor without causing an across the board wilting of the entire CPU 110, thereby maintaining a higher QoS level by powering down only the identified thermal aggressor. In still other embodiments, the TPM 101 may select a proximate component to the thermal aggressor and completely power it down in an effort to leverage it as a heat sink for drawing thermal energy away from the thermal aggressor. In other embodiments, the TPM 101 may cause an identified thermal aggressor to enter into a cycle of high processing speeds followed by forced power collapses for cooling off periods. In yet other embodiments, the TPM 101 may reallocate workloads within a thermal aggressor from a high power density sub-core area to a lower power density main core area. In other embodiments, the TPM 101 may modify the use of external, off-chip thermal generators known to be proximally located to the identified thermal aggressor. In other embodiments, the TPM 101 may cause the power supplied to a thermal aggressor to be reduced, thereby mitigating the thermal energy generated by the thermal aggressor at the expense of processing efficiency.

Advantageously, thermal mitigation measures taken in the second phase are targeted toward known thermal aggressors on and off chip 102. The recognition of a thermal condition by a sensor 157 may operate to trigger the application of a thermal mitigation measure, but the specific thermal aggressor that may be the subject of the mitigation measure is identified by leveraging data monitored from the various CPU 110 registers. In this way, when a thermal condition warranting thermal mitigation is recognized, a fine grained, targeted thermal mitigation approach may be launched. Notably, therefore, while the specific thermal mitigation technique(s) that may be employed by a given embodiment may be novel, in and of, themselves, the particular thermal mitigation technique(s) leveraged by any given embodiment on a targeted thermal aggressor will not limit the scope of the disclosure.

Figure 2:
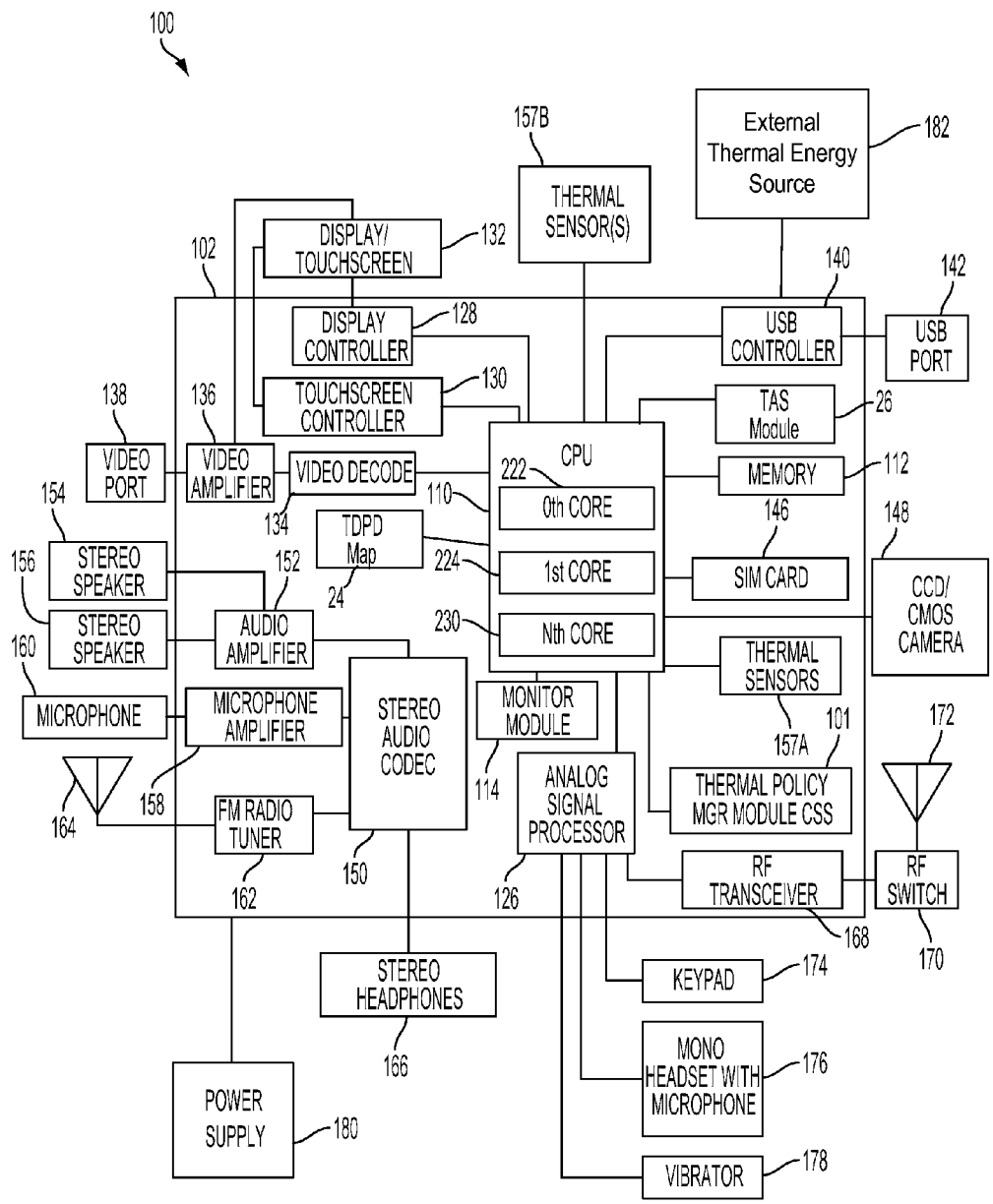
FIG. 2 is a functional block diagram illustrating an exemplary embodiment of the PCD of FIG. 1.

FIG. 2 is a functional block diagram of an exemplary, non-limiting aspect of a PCD 100 in the form of a wireless telephone for implementing methods and systems for monitoring thermal conditions, identifying thermal aggressors and applying fine grained thermal mitigation measures. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the TPM module(s) 101 may be responsible for monitoring and applying thermal policies that include one or more fine grained thermal mitigation techniques that may help a PCD 100 manage thermal conditions and/or thermal loads and avoid experiencing adverse thermal conditions, such as, for example, reaching critical temperatures, while maintaining a high level of functionality.

FIG. 2 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the TPM module 101. In some embodiments, monitor module 114 may also monitor and/or filter data outputs from register dumps uniquely associated with the cores 222, 224, 230 and transmit the monitored and/or filtered data to the TAS module 26. The TPM module 101 may work with the monitor module 114 to identify adverse thermal conditions that may warrant application of one or more thermal mitigation techniques to identified thermal aggressors within chip 102.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110.

In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 3A). However, other types of thermal sensors 157 may be employed without departing from the scope of the invention.

The thermal sensors 157, in addition to being controlled and monitored by an ADC controller 103, may also be controlled and monitored by one or more TPM module(s) 101. The TPM module(s) may comprise software which is executed by the CPU 110. However, the TPM module(s) 101 may also be formed from hardware and/or firmware without departing from the scope of the invention. The TPM module(s) 101 may be responsible for monitoring and applying thermal policies that include one or more fine grained thermal mitigation techniques that may help a PCD 100 avoid critical temperatures while maintaining a high level of functionality.

Similarly, the thermal aggressor selector module(s) 26 may comprise software which is executed by the CPU 110. However, the thermal aggressor selector module(s) 26 may also be formed from hardware and/or firmware without departing from the scope of the invention.

Returning to FIG. 2, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102.

However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more TPM module(s) 101 and TAS module(s) 26. These instructions that form the TPM module(s) 101 and TAS module(s) 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3A:
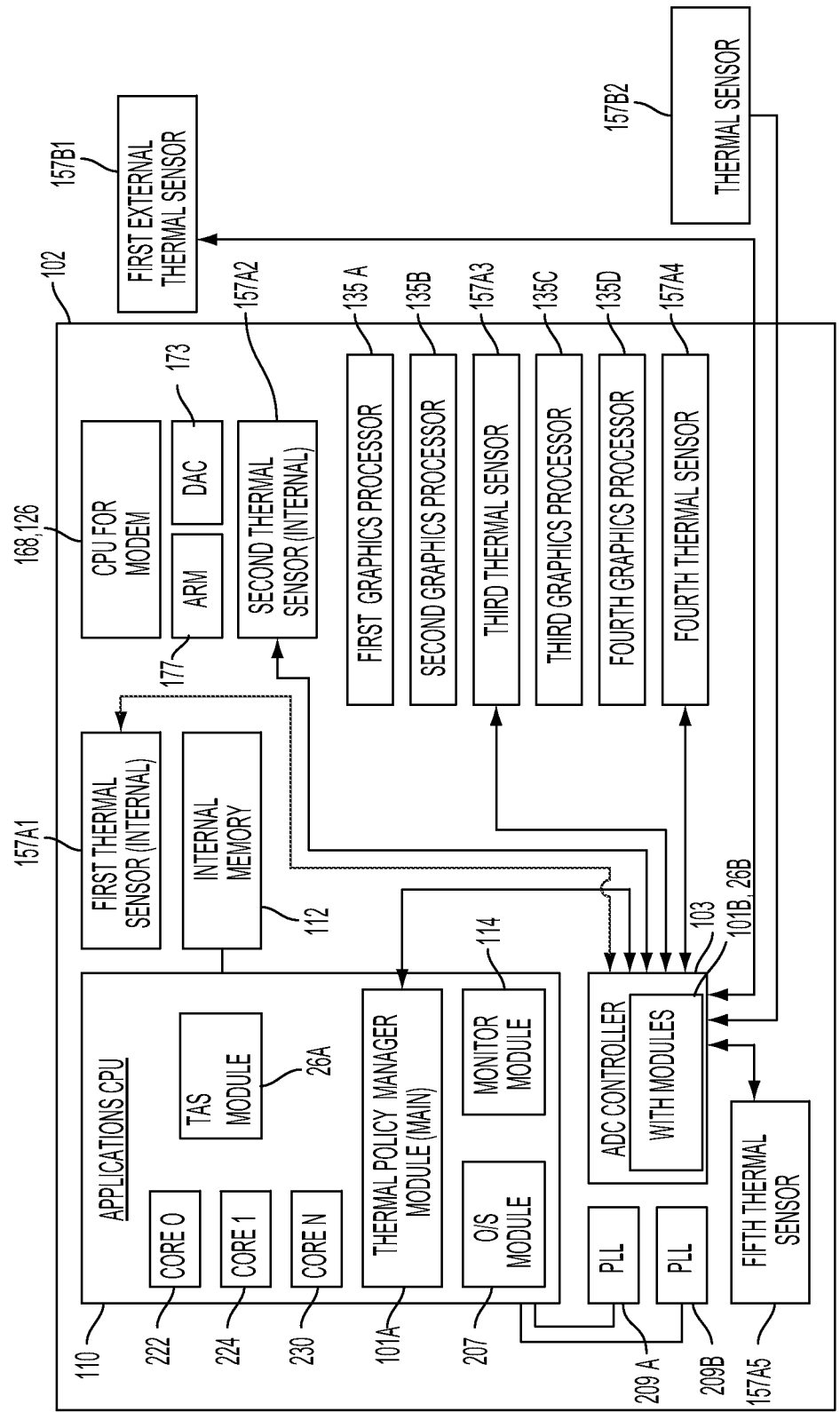
FIG. 3A is a functional block diagram illustrating an exemplary spatial arrangement of hardware for the chip illustrated in FIG. 2.

FIG. 3A is a functional block diagram illustrating an exemplary spatial arrangement of hardware for the chip 102 illustrated in FIG. 2. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a TPM module 101A and/or TAS module 26A (when embodied in software) or it may include a TPM module 101A and/or TAS module 26A (when embodied in hardware). The application CPU 110 is further illustrated to include operating system ("O/S") module 207 and a monitor module 114. Further details about the monitor module 114 will be described below in connection with FIG. 3B.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B and/or thermal aggressor selection module 26B that works in conjunction with the main modules 101A, 26A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations.

As a non-limiting example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 3A may be provided without departing from the scope of the invention. FIG. 3A illustrates yet one exemplary spatial arrangement and how the main TPM and TAS modules 101A, 26A and ADC controller 103 with its TPM and TAS modules 101B, 26B may recognize thermal conditions that are a function of the exemplary spatial arrangement illustrated in FIG. 3A, identify thermal aggressors contributing to the condition and apply fine grained thermal mitigation measures.

Figure 3B:
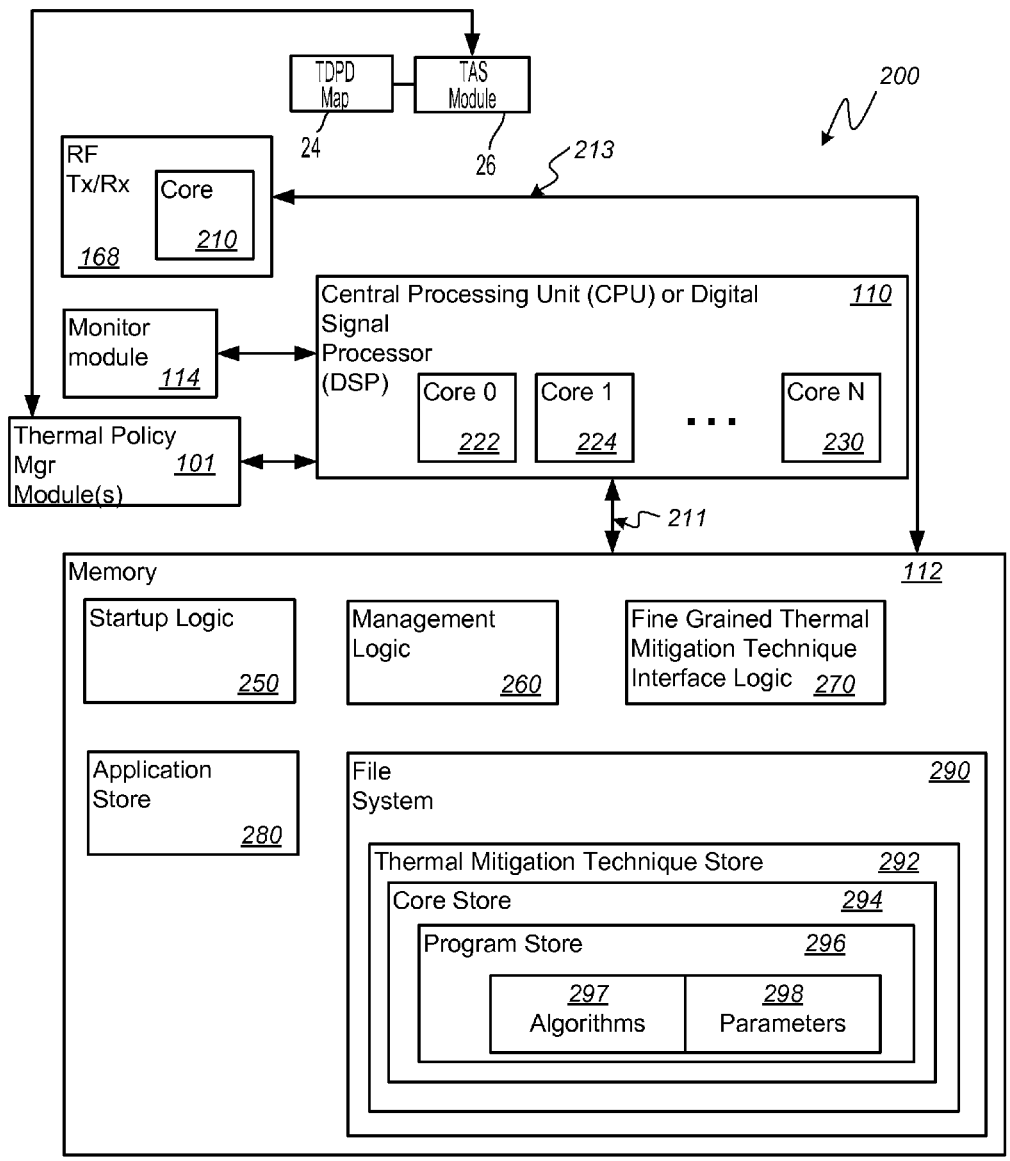
FIG. 3B is a schematic diagram illustrating an exemplary software architecture of the PCD of FIG. 2 for supporting fine grained thermal mitigation techniques applied to thermal aggressors identified and selected by leveraging the TDPD map of FIG. 1.

FIG. 3B is a schematic diagram illustrating an exemplary software architecture of the PCD 100 of FIG. 2 and FIG. 3A for supporting identification of thermal aggressors and application of algorithms associated with fine grained thermal mitigation techniques. Any number of algorithms may form or be part of at least one fine grained thermal mitigation technique that may be applied by the thermal policy manager 101 when certain thermal conditions are met and thermal aggressors identified.

As illustrated in FIG. 3B, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the TPM module(s) 101 that may comprise software and/or hardware. If embodied as software, the TPM module 101 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 168 is implemented via digital circuit elements and includes at least one processor such as the core processor 210 (labeled "Core"). In this digital implementation, the RF transceiver 168 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 3B, it should be noted that one or more of startup logic 250, management logic 260, fine grained thermal mitigation technique interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the fine grained thermal mitigation technique interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 168.

The startup logic 250 includes one or more executable instructions for selectively identifying, loading, and executing a select program for managing or controlling the performance of one or more of the available cores such as the first core 222, the second core 224 through to the $N^{th}$ core 230. A select program can be found in the program store 296 of the embedded file system 290 and is defined by a specific combination of a performance scaling algorithm 297 and a set of parameters 298. The select program, when executed by one or more of the core processors in the CPU 110 and the core 210 in the RF transceiver 168, may operate in accordance with one or more signals provided by the monitor module 114 in combination with control signals provided by the one or more TPM module(s) 101 to scale the performance of the respective processor core. In this regard, the monitor module 114 may provide one or more indicators of events, processes, applications, resource status conditions, elapsed time, as well as temperature as received from the TPM module 101.

The management logic 260 includes one or more executable instructions for terminating a thermal mitigation program on one or more of the respective processor cores, as well as selectively identifying, loading, and executing a more suitable replacement program for managing or controlling the performance of one or more of the available cores. The management logic 260 is arranged to perform these functions at run time or while the PCD 100 is powered and in use by an operator of the device. A replacement program can be found in the program store 296 of the embedded file system 290 and is defined by a specific combination of a performance scaling algorithm 297 and a set of parameters 298.

The replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc in response to control signals originating from the TPM 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 168 when the received signal power falls below an identified threshold. By way of further example, the inputs may include a change to the management logic 260 that instructs the PCD 100 to apply a desired program when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal mitigation technique store 292. In this regard, the file system 290 may include a reserved section of its total file system capacity for the storage of information for the configuration and management of the various parameters 298 and thermal mitigation algorithms 297 used by the PCD 100. As shown in FIG. 3B, the store 292 includes a core store 294, which includes a program store 296, which includes one or more thermal mitigation programs.

Figure 4:
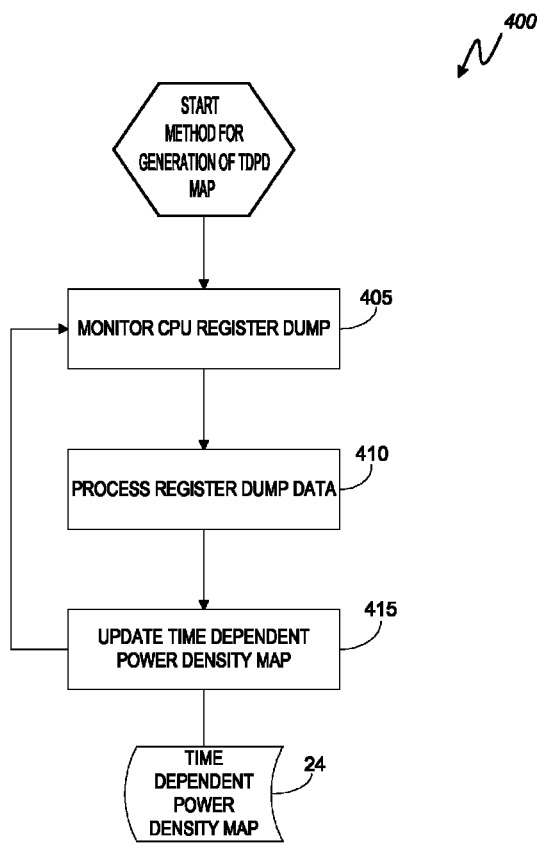
FIG. 4 is a logical flowchart illustrating an embodiment of a method for generating the inter-processor time dependent power density map of FIG. 1 for use by the PCD to identify and select thermal aggressors and apply fine grain thermal mitigation measures.

FIG. 4 is a logical flowchart illustrating an embodiment of a method 400 for generating the inter-processor TDPD map 24 of FIG. 1 for use by the PCD 100 to identify and select thermal aggressors and apply fine grain thermal mitigation measures. As explained above, embodiments may include a TAS module 26 configured to monitor data discarded from registers associated with various processing components of the PCD 100. In the method 400, at block 405, the register dump for one or more specific processing components is monitored by TAS module 26. Subsequently, at block 410, the monitored register dump data may be mined and statistically analyzed in order to deduce a real-time and historical workload for a given core uniquely associated with the monitored data. Advantageously, in conjunction with the performance specifications of a given processing component, the deduced workload may be leveraged to calculate power consumption by the given component over a period of time. At block 415, the calculated power consumption over a period of time may be stored in a TDPD map 24 that serves to indicate the location of both thermal aggressors and underutilized components within the chip 102.

Figure 5:
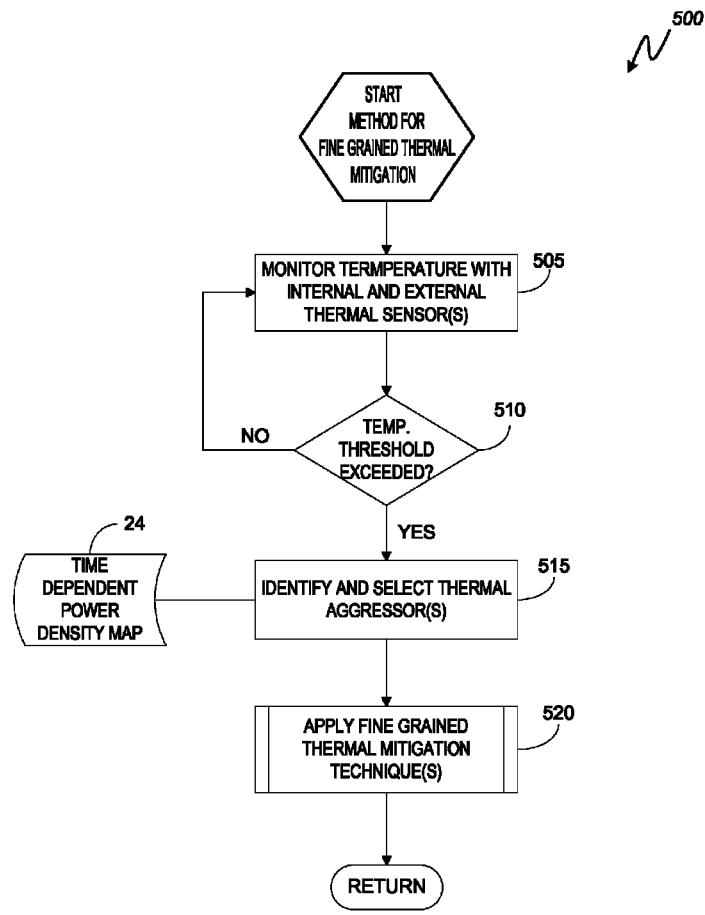
FIG. 5 is a logical flowchart illustrating a method for identifying and selecting thermal aggressors by leveraging a time dependent power density map.

FIG. 5 is a logical flowchart illustrating a method 500 for identifying and selecting thermal aggressors by leveraging TDPD map 24. Method 500 of FIG. 5 starts with a first block 505 in which the TPM 101 may monitor temperature with internal and external thermal sensors 157. The TPM 101 may monitor, actively poll, and/or receive interrupts from one or more thermal sensors 157. In a particular thermal state not exceeding a predefined thermal threshold, the TPM 101 remains passive and does not apply any thermal mitigation techniques.

Next, in decision block 510, the TPM 101 may determine if a temperature that exceeds a predetermined threshold has been detected by one or more thermal sensors 157. If the inquiry to decision block 510 is negative, then the "NO" branch is followed back to block 505. If the inquiry to decision block 510 is positive, then the "YES" branch is followed to block 515 in which the TAS module 26 may reference TDPD map 24 to identify and select thermal aggressor(s) that may be contributing to the detected temperature. The TAS module 26 may identify the selected thermal aggressor(s), along with the identification of one or more underutilized processing components, to the TPM 101.

Next, in subroutine block 520, the TPM 101 may apply a fine grained thermal mitigation technique that targets specific thermal aggressors identified by the TAS module 26. For example, the TPM 101 may cause the targeted application of thermal mitigation techniques such as, but not limited to, (1) load scaling and/or (2) load dynamic scaling and/or (3) spatial load shifting and/or (4) process load reallocation as described above.

Figure 6:
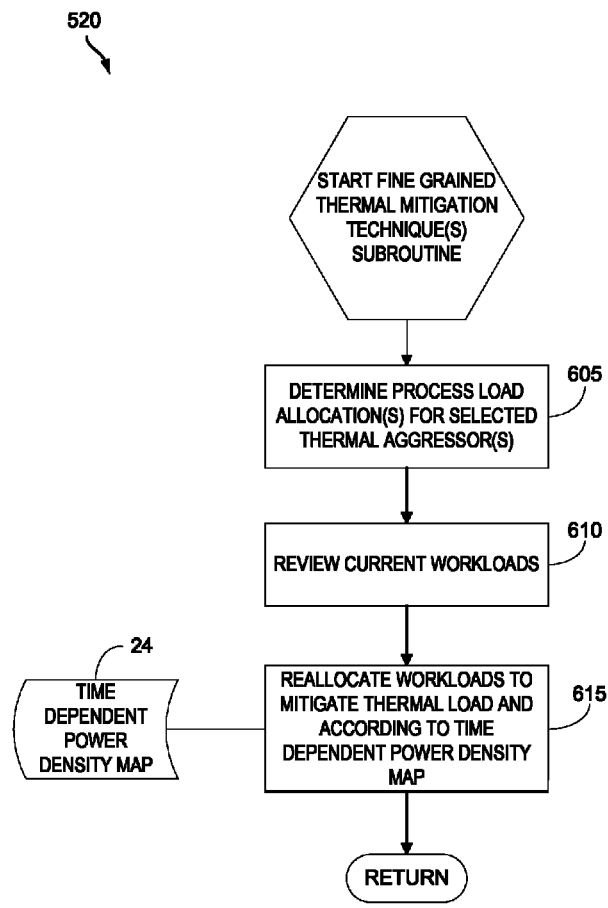
FIG. 6 is a logical flowchart illustrating a sub-method or subroutine for applying fine grained thermal mitigation techniques.

FIG. 6 is a logical flowchart illustrating an exemplary, non-limiting sub-method or subroutine 520 for applying fine grained thermal mitigation techniques. The method 520 of FIG. 6 starts with block 605. At block 605, the TPM 101 has received, from TAS module 26, identification of one or more thermal aggressors that may be contributing to the temperature sensed by sensor 157 and resolves to apply a fine grained thermal mitigation technique to the identified aggressor. Notably, as described above, embodiments seek to target specific thermal aggressors in an effort to maintain a high level of service quality by only applying thermal mitigation measures to specific components identified as thermal aggressors within PCD 100. As such, the particular thermal mitigation technique that is triggered by the TPM 101 of any given embodiment, while perhaps novel in and of itself, is not limiting on the scope of this disclosure. It will occur to one of ordinary skill in the art to apply any thermal mitigation technique that may be suitable for targeted application on an identified thermal aggressor.

By way of a non-limiting example, the subroutine 520 may include at block 605 that the TPM 101 determine the current process workload allocated to the one or more selected thermal aggressors. At block 610, the current workloads of underutilized processing components, as identified by the TAS module 26 via TDPD map 24, may be considered for reallocation of workloads currently processed, or scheduled by scheduler 207 to be processed, by the thermal aggressor(s). Subsequently, at block 615, workloads associated with thermal energy generation by an identified thermal aggressor may be reallocated to underutilized processing components. In this way, the temperature sensed by sensor 157 may be lowered by lifting processing burden from a thermal aggressor that is proximally located to the point of temperature measurement. Additionally, because the processing burden has been reallocated to underutilized processing capacity, the quality of service experienced by a user of PCD 100 may remain substantially unaffected.

Figure 7:
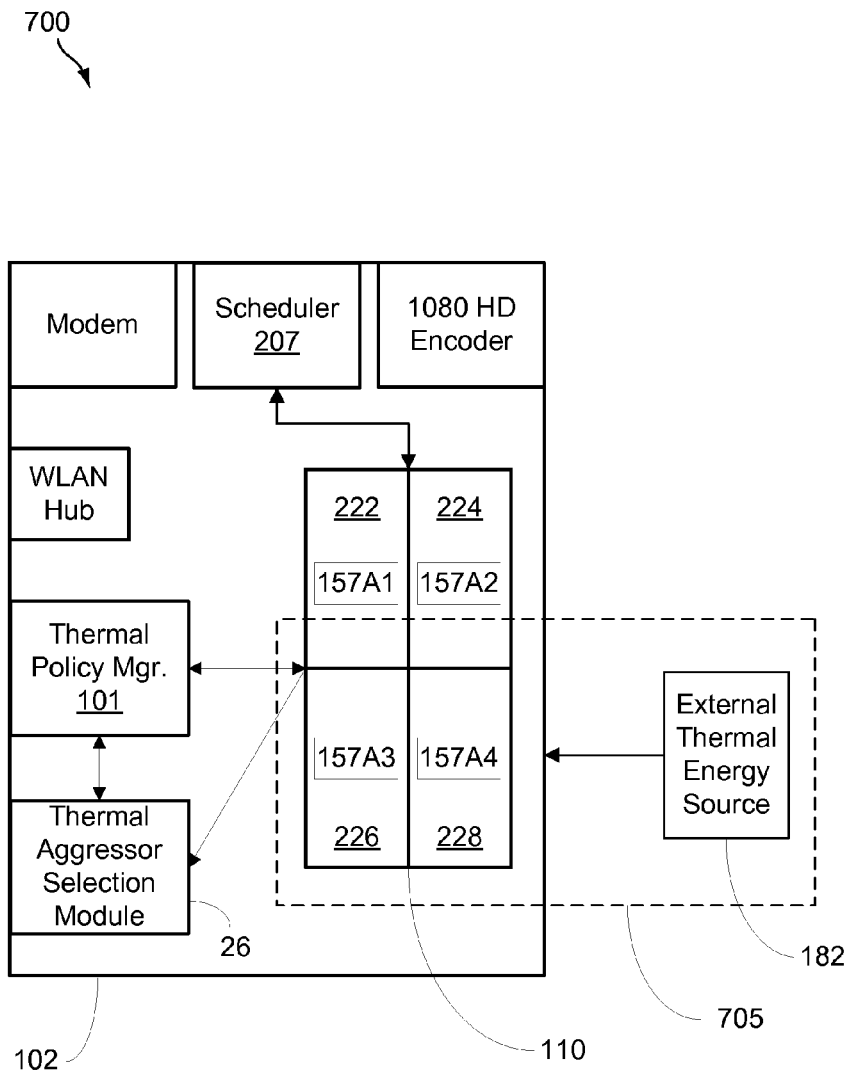
FIG. 7 is a functional block diagram illustrating an exemplary floor plan of an application specific integrated circuit configured to generate TDPD map and leverage the TDPD map to identify and select thermal aggressors for targeted application of fine grained thermal mitigation measures.

FIG. 7 is a functional block diagram illustrating an exemplary floor plan 700 of an application specific integrated circuit ("ASIC") 102 that may benefit from the application of the methods described above. In the FIG. 7 illustration, CPU bank 110, comprising individual cores 222, 224, 226 and 228, represents the primary components generating thermal energy on ASIC 102. A thermal energy source 182, for example, does not reside on ASIC 102, but is represented as being in near proximity 705 to cores 226 and 228 of CPU bank 110. For example, due to limited physical space within a PCD 100, a thermal energy source 182, such as a power management integrated circuit ("PMIC"), may reside immediately behind and adjacent to ASIC 102. As such, one of ordinary skill in the art will recognize that thermal energy dissipated from an energy source 182 may adversely affect temperature readings taken from sensors 157 on either of cores 226 and 228 within CPU 110.

External thermal energy sources 182 may be placed in immediate proximity 705 to a given processing core, thereby generating a bias in the processing core for a higher average operating temperature when the thermal energy dissipated from the components propagates through the core. One of ordinary skill in the art will recognize that the adverse affect of these proximate components on processing core temperature can be difficult to predict or simulate across various PCD 100 configurations and/or use cases. As such, one of ordinary skill in the art will also recognize that an advantage of thermal mitigation algorithms that can be leveraged in real-time, or near real-time, is that temperature bias in processing components which may result from adjacent components within PCD 100 can be accommodated without custom configurations or pre-generated thermal load steering scenarios and parameters. That is, processing loads can be allocated, or reallocated in real-time based on real-time, actual temperature readings taken in conjunction with data captured in a TDPD map by TAS module 26.

For instance, under certain conditions the external energy source 182 may contribute to a temperature reading by sensor 157A4 in excess of a threshold. The TAS module 26, having monitored and statistically analyzed the register dumps associated with each of cores 222, 224, 226 and 228, may determine by reference to a TDPD map 24 that cores 226 and 222 represent underutilized processing capacity. Also referring to the TDPD map 24, TAS module 26 may identify core 228 as a thermal aggressor due to a relatively high workload burden. With the data provided to the TPM 101, process workload scheduled for core 228 may be all but entirely reallocated to core 222. Notably, because core 226 is also in proximity to the external thermal energy source 182, the fine grained thermal mitigation measure may determine that process workload should not be reallocated to core 226 even though the TDPD map 24 indicates that core 226 represents underutilized processing capacity.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing thermal energy generation in a portable computing device, the method comprising:
   monitoring data discarded from one or more processing core registers, wherein a register is a memory device uniquely associated with a processing core;
   analyzing the data to deduce individual workloads processed by the one or more cores over a unit of time;
   calculating a power consumption over the unit of time for each of the one or more cores, wherein the power consumption is calculated based on the deduced workloads; and
   storing the calculated power consumption for each of the one or more cores in a time dependent power density ("TDPD") map.

2. The method of claim 1, further comprising:
   placing a temperature sensor proximate to each of the one or more processing cores;
   monitoring temperature readings generated by the temperature sensors;
   determining from a first temperature reading that a temperature threshold has been exceeded in a thermal area associated with one or more of the processing cores;
   referencing the TDPD map to identify thermal aggressors proximate to the thermal area, wherein a thermal aggressor is a processing core having a calculated power consumption that is high relative to other processing cores within the PCD; and
   applying a thermal mitigation technique to the identified thermal aggressors, wherein application of the thermal mitigation technique serves to lower the temperature reading below the temperature threshold.

3. The method of claim 2, further comprising:
   referencing the TDPD map to identify one or more underutilized processing components, wherein an underutilized processing component is a processing core having a calculated power consumption that is low relative to the identified thermal aggressors.

4. The method of claim 3, wherein the thermal mitigation technique comprises:
   reallocating a process load portion from a thermal aggressor to an underutilized processing component.

5. The method of claim 2, wherein the thermal mitigation technique comprises:
   reducing the power supplied to the identified thermal aggressors.

6. The method of claim 2, wherein the thermal mitigation technique comprises:
   powering down a component near the identified thermal aggressors, wherein powering down the component causes the component to behave as a heat sink that absorbs thermal energy generated by the thermal aggressor.

7. The method of claim 2, wherein a thermal energy source external to a chip comprising the one or more cores causes the temperature threshold to be exceeded.

8. The method of claim 1, wherein the monitored register dump data is compared to register dump data associated with a known use scenario and the power consumption per core is calculated according to the power consumption associated with the known use scenario.

9. The method of claim 1, wherein the power consumption is calculated based on the performance specifications of the one or more cores.

10. The method of claim 1, further comprising continually updating the TDPD map.

11. A computer system for managing thermal energy generation in a portable computing device, the system comprising:
a thermal aggressor selection ("TAS") module configured to:
monitor data discarded from one or more processing core registers, wherein a register is a memory device uniquely associated with a processing core;
analyze the data to deduce individual workloads processed by the one or more cores over a unit of time;
calculate a power consumption over the unit of time for each of the one or more cores, wherein the power consumption is calculated based on the deduced workloads; and
store the calculated power consumption for each of the one or more cores in a time dependent power density ("TDPD") map.

12. The computer system of claim 11, further comprising:
a temperature sensor proximate to each of the one or more processing cores;
a monitoring module configured to:
monitor temperature readings generated by the temperature sensors; and
determine from a first temperature reading that a temperature threshold has been exceeded in a thermal area associated with one or more of the processing cores;
a thermal policy manager ("TPM") module configured to:
request the TAS module to reference the TDPD map to identify thermal aggressors proximate to the thermal area, wherein a thermal aggressor is a processing core having a calculated power consumption that is high relative to other processing cores within the PCD; and
apply a thermal mitigation technique to the identified thermal aggressors, wherein application of the thermal mitigation technique serves to lower the temperature reading below the temperature threshold.

13. The computer system of claim 12, wherein the TDPD map is also referenced to identify one or more underutilized processing components, wherein an underutilized processing component is a processing core having a calculated power consumption that is low relative to the identified thermal aggressors.

14. The computer system of claim 13, wherein the thermal mitigation technique applied by the TPM module comprises reallocating a process load portion from a thermal aggressor to an underutilized processing component.

15. The computer system of claim 12, wherein the thermal mitigation technique applied by the TPM module comprises reducing the power supplied to the identified thermal aggressors.

16. The computer system of claim 12, wherein the thermal mitigation technique applied by the TPM module comprises powering down a component near the identified thermal aggressors, wherein powering down the component causes the component to behave as a heat sink that absorbs thermal energy generated by the thermal aggressor.

17. The computer system of claim 12, wherein a thermal energy source external to a chip comprising the one or more cores causes the temperature threshold to be exceeded.

18. The computer system of claim 11, wherein the monitored register dump data is compared by the TAS module to register dump data associated with a known use scenario and the power consumption per core is calculated by the TAS module according to the power consumption associated with the known use scenario.

19. The computer system of claim 11, wherein the power consumption is calculated by the TAS module based on the performance specifications of the one or more cores.

20. The computer system of claim 11, wherein the TAS module is further configured to continually update the TDPD map.

21. A computer system for managing thermal energy generation in a portable computing device, the system comprising:
means for monitoring data discarded from one or more processing core registers, wherein a register is a memory device uniquely associated with a processing core;
means for analyzing the data to deduce individual workloads processed by the one or more cores over a unit of time;
means for calculating a power consumption over the unit of time for each of the one or more cores, wherein the power consumption is calculated based on the deduced workloads; and
means for storing the calculated power consumption for each of the one or more cores in a time dependent power density ("TDPD") map.

22. The computer system of claim 21, further comprising:
means for monitoring temperature readings generated by one or more temperature sensors proximate to the one or more processing cores; and
means for determining from a first temperature reading that a temperature threshold has been exceeded in a thermal area associated with one or more of the processing cores;
means for referencing the TDPD map to identify thermal aggressors proximate to the thermal area, wherein a thermal aggressor is a processing core having a calculated power consumption that is high relative to other processing cores within the PCD; and
means for applying a thermal mitigation technique to the identified thermal aggressors, wherein application of the thermal mitigation technique serves to lower the temperature reading below the temperature threshold.

23. The computer system of claim 22, further comprising means for referencing the TDPD map to identify one or more underutilized processing components, wherein an underutilized processing component is a processing core having a calculated power consumption that is low relative to the identified thermal aggressors.

24. The computer system of claim 23, wherein the thermal mitigation technique comprises reallocating a process load portion from a thermal aggressor to an underutilized processing component.

25. The computer system of claim 22, wherein the thermal mitigation technique comprises reducing the power supplied to the identified thermal aggressors.

26. The computer system of claim 22, wherein the thermal mitigation technique comprises powering down a component near the identified thermal aggressors, wherein powering down the component causes the component to behave as a heat sink that absorbs thermal energy generated by the thermal aggressor.

27. The computer system of claim 22, wherein a thermal energy source external to a chip comprising the one or more cores causes the temperature threshold to be exceeded.

28. The computer system of claim 21, further comprising means to compare the monitored register dump data to register dump data associated with a known use scenario and the power consumption per core is calculated according to the power consumption associated with the known use scenario.

29. The computer system of claim 21, wherein the power consumption is calculated based on the performance specifications of the one or more cores.

30. The computer system of claim 21, further comprising means to continually update the TDPD map.

31. A computer program product comprising a non-transitory computer usable medium having a computer readable program code embodied therein, said computer readable program code adapted to be executed to implement a method for managing thermal energy generation in a portable computing device, said method comprising:

monitoring data discarded from one or more processing core registers, wherein a register is a memory device uniquely associated with a processing core;

analyzing the data to deduce individual workloads processed by the one or more cores over a unit of time;

calculating a power consumption over the unit of time for each of the one or more cores, wherein the power consumption is calculated based on the deduced workloads; and storing the calculated power consumption for each of the one or more cores in a time dependent power density ("TDPD") map.

32. The computer program product of claim 31, wherein the program code implementing the method further comprises:

monitoring temperature readings generated by one or more temperature sensors proximate to the one or more processing cores;

determining from a first temperature reading that a temperature threshold has been exceeded in a thermal area associated with one or more of the processing cores;

referencing the TDPD map to identify thermal aggressors proximate to the thermal area, wherein a thermal aggressor is a processing core having a calculated power consumption that is high relative to other processing cores within the PCD; and applying a thermal mitigation technique to the identified thermal aggressors, wherein application of the thermal mitigation technique serves to lower the temperature reading below the temperature threshold.

33. The computer program product of claim 32, wherein the program code implementing the method further comprises referencing the TDPD map to identify one or more underutilized processing components, wherein an underutilized processing component is a processing core having a calculated power consumption that is low relative to the identified thermal aggressors.

34. The computer program product of claim 33, wherein the thermal mitigation technique comprises:

reallocating a process load portion from a thermal aggressor to an underutilized processing component.

35. The computer program product of claim 32, wherein the thermal mitigation technique comprises:

reducing the power supplied to the identified thermal aggressors.

36. The computer program product of claim 32, wherein the thermal mitigation technique comprises:

powering down a component near the identified thermal aggressors, wherein powering down the component causes the component to behave as a heat sink that absorbs thermal energy generated by the thermal aggressor.

37. The computer program product of claim 31, wherein the program code implementing the method further comprises determining that a thermal energy source external to a chip comprising the one or more cores caused the temperature threshold to be exceeded.

38. The computer program product of claim 31, wherein the program code implementing the method further comprises comparing the monitored register dump data to register dump data associated with a known use scenario and the power consumption per core is calculated according to the power consumption associated with the known use scenario.

39. The computer program product of claim 31, wherein the program code implementing the method further comprises calculating the power consumption based on the performance specifications of the one or more cores.

40. The computer program product of claim 31, wherein the program code implementing the method further comprises continually updating the TDPD map.

* * * * *